(12) United States Patent
Kimura et al.

(10) Patent No.: US 11,763,728 B2
(45) Date of Patent: Sep. 19, 2023

(54) IMAGE DISPLAY DEVICE, DISPLAY CONTROL METHOD, AND CRADLE

(71) Applicant: JVCKENWOOD Corporation, Yokohama (JP)

(72) Inventors: Hideyuki Kimura, Yokohama (JP); Makoto Kitou, Yokohama (JP); Hiroshi Takeshita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/833,552

(22) Filed: Jun. 6, 2022

(65) Prior Publication Data
US 2022/0301485 A1 Sep. 22, 2022

Related U.S. Application Data

(63) Continuation of application No. PCT/JP2021/000274, filed on Jan. 7, 2021.

(30) Foreign Application Priority Data

Jan. 23, 2020 (JP) .................... 2020-009189
Mar. 2, 2020 (JP) .................... 2020-035045

(51) Int. Cl.
*G09G 3/20* (2006.01)

(52) U.S. Cl.
CPC ... *G09G 3/2096* (2013.01); *G09G 2320/0233* (2013.01); *G09G 2360/145* (2013.01)

(58) Field of Classification Search
CPC ......... G09G 3/2096; G09G 2320/0233; G09G 2360/145
See application file for complete search history.

(56) References Cited

U.S. PATENT DOCUMENTS

| | | | |
|---|---|---|---|
| 2006/0187476 A1* | 8/2006 | Yamada ................... | H04N 5/20 358/1.9 |
| 2007/0120772 A1* | 5/2007 | Kim ......................... | G09G 3/20 345/63 |
| 2015/0107142 A1* | 4/2015 | Burrous .................. | G09F 13/18 40/714 |
| 2016/0070405 A1* | 3/2016 | Wada ........................ | G06F 1/26 345/173 |

(Continued)

OTHER PUBLICATIONS

JVC.com. "3 million pixels 21.3 inch color LCD monitor CL-S 300." Healthcare System. JVC. Product Specifications. Retrieved: Apr. 15, 2022. Https://www.jvc.com/jp/pro/healthcare_sys/lineup/cl-s300/. English and Japanese Language. 16 pages.

(Continued)

*Primary Examiner* — Towfiq Elahi
(74) *Attorney, Agent, or Firm* — Procopio, Cory, Hargreaves & Savitch LLP

(57) ABSTRACT

There are provided an image display device, a display control method, and a cradle that are capable of adjusting display image quality with a simple configuration.
An image display device according to the present embodiment includes a tablet terminal having a display, a cradle holding the tablet terminal, and an optical sensor provided on the cradle and capable of receiving display light from the display.

9 Claims, 17 Drawing Sheets

(56) References Cited

U.S. PATENT DOCUMENTS

2018/0120163 A1* 5/2018 Su ........................ G01J 3/0291
2021/0400823 A1* 12/2021 Uebelacker .............. A47G 1/06

OTHER PUBLICATIONS

JVC.com. "JVC Medical Monitors." 3MP 21.3" Monochrome Monitor >MS-S300. Product Features. Retrieved: Feb. 18, 2022. Https://healthcare.jvc.com/medical/ms-s300/. English Language . 7 pages.

* cited by examiner

IMAGE DISPLAY DEVICE, DISPLAY CONTROL METHOD, AND CRADLE

CROSS REFERENCE TO RELATED APPLICATION

This application is based upon and claims the benefit of priorities of Japanese Patent Application No. 2020-9189 filed on Jan. 23, 2020 and Japanese Patent Application No. 2020-35045 filed on Mar. 2, 2020, the disclosures of which are incorporated herein in its entirety by reference.

BACKGROUND

The present invention relates to an image display device, a display control method, and a cradle.

Some image display devices, such as liquid crystal displays, have a function of more finely performing display image quality adjustment than others. These are, for example, medical monitors that read medical images, desktop publishing (DTP) monitors used to design publications, and the like. Non Patent Literature 1 (https://www3.jvckenwood.com/pro/healthcare_sys/cl-s300/) discloses a liquid crystal display provided with a sensor function at a bezel part to measure a display characteristic of a display screen.

SUMMARY

Incidentally, there is a demand for adjusting display image quality of tablet terminals. However, providing a sensor at a bezel part causes a problem that it is difficult to reduce the size and the weight of a tablet terminal. In addition, in order for a sensor to receive display light from a display, the sensor needs to be provided over the display screen (display area) of the display. This also causes a problem that a part of a display image cannot be seen.

Moreover, higher display characteristics are required especially for medical monitors. For example, the medical standards specify test methods and tolerance differences for uniformity. Note that, uniformity is a characteristic that indicates partial luminance variance of a display screen.

In order to correct uniformity, it is necessary to measure the luminance distribution of a display. For this reason, a user measures the luminance distribution of a display using an optical sensor. For example, in order to measure the luminance distribution of the display, the display displays a test pattern for measurement. Then, the user moves the position of the optical sensor according to the test pattern to perform measurement at a plurality of measurement points. In this manner, there is a problem that a user is required to perform complicated measurement to correct uniformity.

An image display device according to the present embodiment includes a tablet terminal having a display, a cradle holding the tablet terminal, and an optical sensor provided on the cradle and capable of receiving display light from the display.

A display control method according to the present embodiment, a display device includes a tablet terminal having a display; a cradle holding the tablet terminal; and an optical sensor provided on the cradle, the display control method comprising: a step of detecting, by the optical sensor, display light from the display; and a step of correcting a display characteristic of the display based on a detection result obtained by the optical sensor.

A cradle according to the present embodiment a holding part holding a tablet terminal; and an optical sensor configured to detect display light from a display of the tablet terminal.

DETAILED DESCRIPTION

Hereinafter, specific embodiments to which the present invention is applied will be described in detail with reference to the drawings. However, the present disclosure is not limited to the following embodiments. In addition, the following description and the drawings are simplified as necessary for the sake of clarity.

First Embodiment

Figure 1:
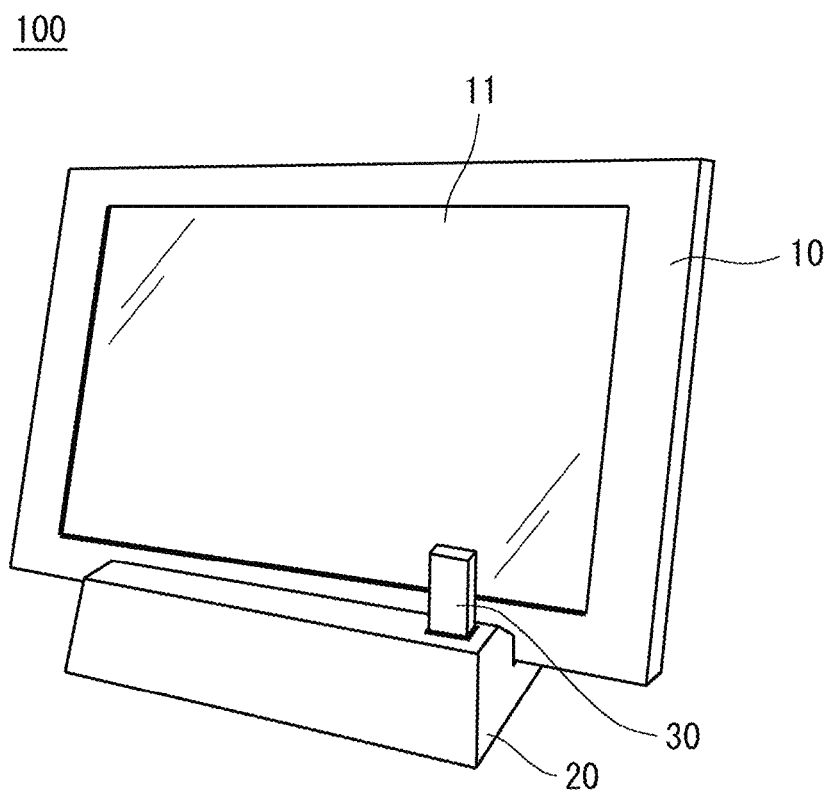
FIG. 1 is a diagram showing an overall configuration of an image display device according to a first embodiment.

With reference to FIG. 1, an image display device 100 according to the present embodiment is described. FIG. 1 is a diagram showing an image display device 100. FIG. 1 is a perspective view of a tablet terminal 10 when viewed from the front side. The image display device 100 includes a tablet terminal 10 and a cradle 20. The tablet terminal 10 has a display 11. The tablet terminal 10 has a rectangular outline.

The display 11 has a liquid crystal display panel, an organic electro-luminescence (EL) display panel, or the like and displays a desired image. That is, an image is displayed by display light from the display 11. In addition, the display 11 is provided with a touch panel for touch operation. The display 11 has a rectangular shape, and its perimeter is a bezel (housing). At the bezel part of the tablet terminal 10, a camera may be provided.

The tablet terminal 10 has a communication function, such as Wi-Fi (registered trademark) or Bluetooth (registered trademark). In addition, the tablet terminal 10 is provided with a processor, a memory, a microphone, a speaker, a camera, a vibrator, a button, and the like. The tablet terminal 10 stores, in the memory, an operating system (OS) program, such as Android (registered trademark), and an application program (application) that operates on the OS. Note that, the tablet terminal 10 may be a smartphone having a calling function, such as telephone. Naturally, the configuration of the tablet terminal 10 is not particularly limited. The tablet terminal 10 is only required to have the display 11 and may not have all of the above configurations.

The cradle 20 detachably holds the tablet terminal 10. When the tablet terminal 10 is placed on the cradle 20, the tablet terminal 10 is held in a standing state. The tablet terminal 10 is held with the display 11 facing a side and obliquely upward.

The cradle 20 includes a charging terminal (not shown) and the like and charges the tablet terminal 10. That is, when a user places the tablet terminal 10 on the cradle 20, the charging terminal of the cradle 20 is inserted into the charging port of the tablet terminal, and charging is started. Naturally, charging of the tablet terminal 10 may be contactless charging. In addition, the cradle 20 may be provided with a charging port, connectors for various interfaces, and input and output terminals (none of which are shown).

The cradle 20 is provided with an optical sensor 30 that performs measurement for display image quality adjustment. The optical sensor 30 is a photodiode, a charge coupled devices (CCD) camera, a complementary metal oxide semiconductor (CMOS) sensor, or the like. The optical sensor 30 outputs a detection signal according to a quantity of detected light. The optical sensor 30 protrudes upward from the cradle 20. While the tablet terminal 10 is placed on the cradle 20, the optical sensor 30 is arranged to face the display 11. That is, the optical sensor 30 is attached to the cradle 20 to face the display screen of the display 11. The optical sensor 30 detects display light from the display 11.

According to a detection result by the optical sensor 30, a correction unit described later corrects the display image quality of the tablet terminal 10. For example, if the quantity of detected light of the optical sensor 30 decreases, the display luminance of the tablet terminal 10 is increased. Alternatively, if the quantity of detected light of the optical sensor 30 increases, the correction unit reduces the display luminance of the tablet terminal 10. For example, if the display 11 is a liquid crystal display, the correction unit adjusts the output of the backlight light source of the liquid crystal display. This corrects the luminance of a display image to be constant.

Alternatively, the correction unit may correct a display gradation level to adjust the display luminance. Specifically, the optical sensor 30 measures the luminance at each gradation level of the screen, and the correction unit identifies the gamma characteristic of the display 11 based on the luminance at each gradation level. The correction unit determines whether the identified gamma characteristic matches a desired gamma characteristic and corrects, if not, the gamma characteristic of the display 11 to adjust it to the desired display characteristic. Note that, if determining that the identified gamma characteristic matches a predetermined gamma characteristic, the correction unit does not adjust the display characteristic of the display 11. In comparison of gamma characteristics, two characteristics may be determined to be matched if they are within a predetermined range. Accordingly, it is possible to maintain constant display image quality.

In this manner, the optical sensor 30 is fixed to the cradle 20 at a position where the optical sensor 30 can receive display light from the display 11. Based on the detection result by the optical sensor 30, the correction unit adjusts the display image quality. Thus, it is possible to adjust the display image quality according to the variation in the display luminance.

Naturally, the colors in addition to the display luminance may be adjusted. For example, if the optical sensor 30 is a sensor that can measure a color characteristic, the optical sensor 30 can detect luminance information about each of RGB and adjust the colors of a display image. In this manner, it is possible to individually and independently correct the display characteristic of each of RGB of the display 11. The sensor that can measure a color characteristic is, for example, a CCD.

Since the optical sensor 30 is provided on the cradle 20, it is possible to reduce the size and the weight of the tablet terminal 10. It is possible to adjust display image quality with a simple configuration. In addition, if the tablet terminal 10 is used, a user detaches the tablet terminal 10 from the cradle 20. Since the measurement for adjustment is not performed while the tablet terminal 10 is used, there is no problem that the optical sensor 30 is provided on the cradle 20.

In addition, the optical sensor 30 is arranged to be positioned at an end portion of the display 11. The optical sensor 30 is preferably in close contact with the display 11. In this manner, it is possible to prevent ambient light, such as room light, from entering the optical sensor 30.

Figure 2:
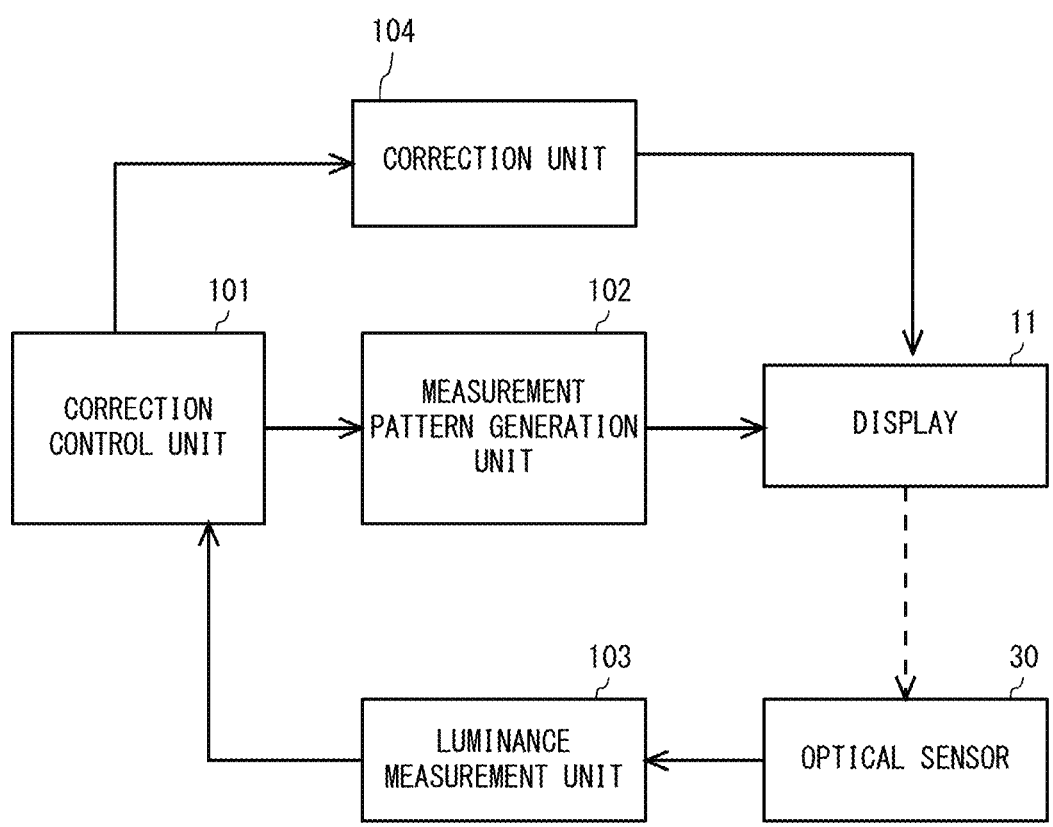
FIG. 2 is a block diagram showing a control system of the image display device.

FIG. 2 is a control block diagram showing a control system for correcting display image quality. The image display device 100 includes a correction control unit 101, a measurement pattern generation unit 102, the display 11, the optical sensor 30, a luminance measurement unit 103, and a correction unit 104. In this specification, correcting display luminance as display image quality is exemplified.

The correction control unit 101 controls each control block to correct display image quality. The measurement pattern generation unit 102 generates a measurement pattern based on a command from the correction control unit 101. The measurement pattern is, for example, a uniform gray pattern. That is, the measurement pattern is an image with a uniform gradation level at least at a position near a measurement point of the optical sensor 30 over the display 11. In addition, the measurement pattern generation unit 102 generates a plurality of gray patterns with different gradation levels by switching them at fixed intervals. The gradation levels gradually change from, for example, black to white over time.

The display 11 displays the measurement pattern. While the measurement pattern is displayed, the optical sensor 30 detects display light from the display 11. The optical sensor 30 preferably detects display light from the display 11 in synchronization with switching of the gray patterns. The optical sensor 30 further preferably detects display light from the display 11 during a predetermined time between when a predetermined time passes after a gray pattern is switched and when the gray pattern is switched to the next one. The optical sensor 30 outputs a detection signal to the luminance measurement unit 103. The luminance measurement unit 103 acquires screen luminance information based on the detection signal.

As a result, the luminance measurement unit 103 acquires the screen luminance information measured for each gradation of each changing measurement pattern. The detection luminance assumed when the display 11 displays a measurement pattern is referred to as a reference luminance. By comparing the actually detected detection luminance with the reference luminance, the luminance measurement unit 103 calculates the screen luminance information. The luminance measurement unit 103 acquires the screen luminance information for each gray pattern. The correction control unit 101 outputs a correction signal to the correction unit 104 based on the screen luminance information. The correction unit 104 corrects the display characteristic of the display 11 based on the correction signal.

The display 11 adjusts the image quality of normal images other than the measurement pattern and then displays them. In this manner, it is possible for the correction control unit 101 to appropriately adjust the display luminance according to changes in the display 11 over time. It is possible to maintain constant display luminance. That is, even when deterioration or variation occurs in the display 11 over time, it is possible to perform display with a stable display luminance characteristic.

The correction control unit 101, the measurement pattern generation unit 102, the luminance measurement unit 103, and the correction unit 104 may be provided in the tablet terminal 10. Alternatively, the correction control unit 101, the measurement pattern generation unit 102, the luminance measurement unit 103, and the correction unit 104 may be provided in the cradle 20. Moreover, some of the correction control unit 101, the measurement pattern generation unit 102, the luminance measurement unit 103, and the correction unit 104 may be provided in the tablet terminal 10, and the others may be provided in the cradle 20.

For example, the correction control unit 101, the measurement pattern generation unit 102, and the correction unit 104 may be provided in the tablet terminal 10, and the luminance measurement unit 103 may be provided in the cradle 20. In this case, the luminance measurement unit 103 transmits the screen luminance information to the tablet terminal 10 by wired or wireless communication. That is, by transmitting and receiving necessary signals and information between the tablet terminal 10 and the cradle 20, it is possible to distribute the control system between the tablet terminal 10 and the cradle 20.

In addition, some functions of the control blocks may be provided in the tablet terminal 10, and the others may be provided in the cradle 20. For example, the tablet terminal 10 and the cradle 20 may cooperate to perform the function of the correction control unit 101.

The processes of the correction control unit 101, the measurement pattern generation unit 102, the luminance measurement unit 103, and the correction unit 104 can be performed by a computer program. For example, the tablet terminal 10 stores an application for measurement and correction. The processor of the tablet terminal 10 executes the application to perform the above processes.

Figure 3:
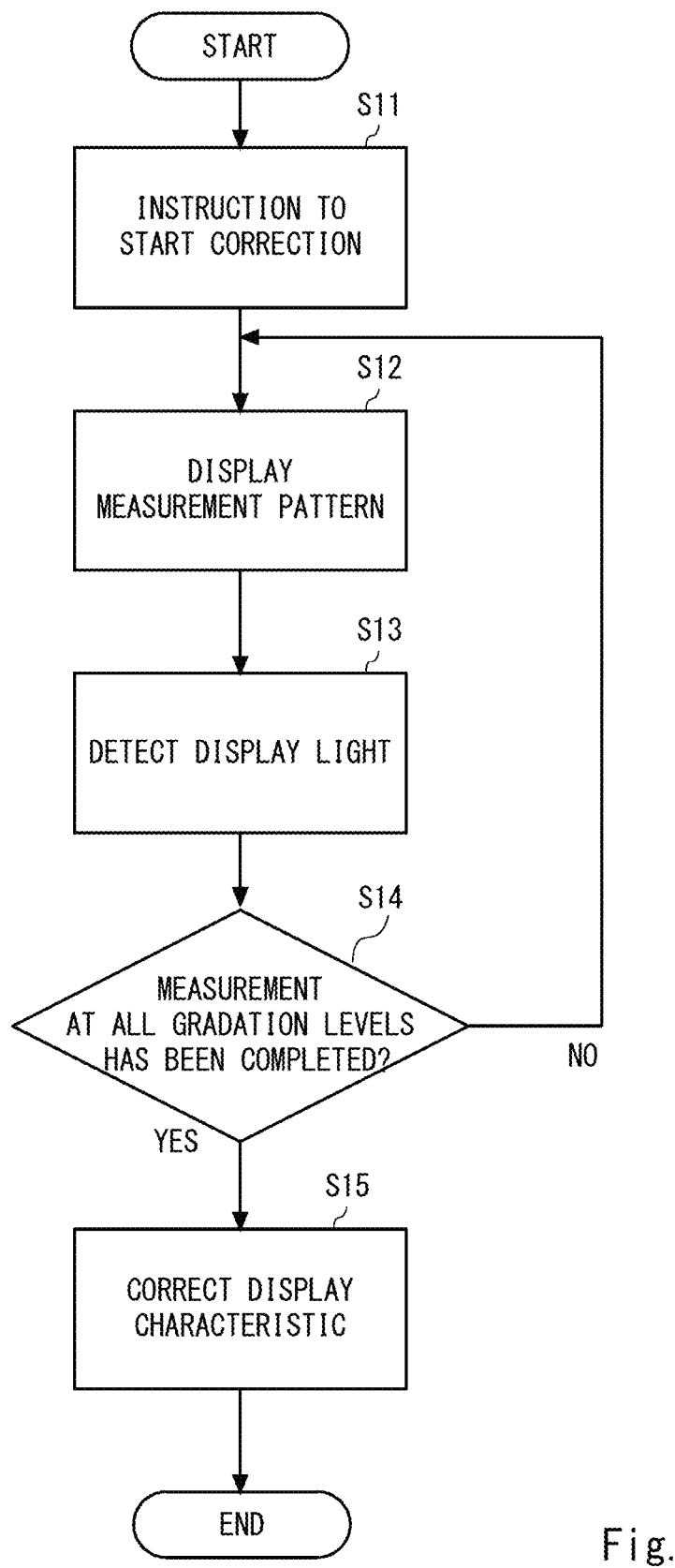
FIG. 3 is a flowchart showing a display control method of the image display device.

FIG. 3 is a flowchart showing a method for adjusting the image quality of the image display device 100. First, a user gives an instruction to start correction (S11). For example, the user operates a touch panel or the like and touches a correction start button. Thus, the correction control unit 101 accepts the instruction to start correction. Alternatively, when the correction control unit 101 detects that the tablet terminal 10 has been placed on the cradle 20, correction may be automatically started. Alternatively, the correction control unit 101 may start correction by triggering the start of charging of the tablet terminal 10.

Next, the display 11 displays a measurement pattern generated by the measurement pattern generation unit 102 (S12). While the measurement pattern is displayed, the optical sensor 30 detects display light (S13). The correction control unit 101 determines whether measurement at all the gradation levels has been completed (S14). When measurement at all the gradation levels has not been completed (No in S14), the process returns to S12, and the next measurement pattern is displayed. That is, the display 11 displays a measurement pattern at a different gradation level (S12), and the optical sensor 30 detects display light (S13). Thus, measurement with a gray pattern at the next gradation level is performed.

When measurement at all the gradation levels has been completed (Yes in S14), the correction control unit 101 and the correction unit 104 correct the display characteristic (S15). That is, the correction control unit 101 generates a correction signal based on a detection result of the display light. Then, the correction unit 104 adjusts the display luminance of the display 11 based on the correction signal. For example, the correction unit 104 adjusts, based on the correction signal, the output of the light source of the display 11 and the gamma characteristic. Accordingly, it is possible to adjust the display image quality with a simple configuration.

Second Embodiment

Figure 4:
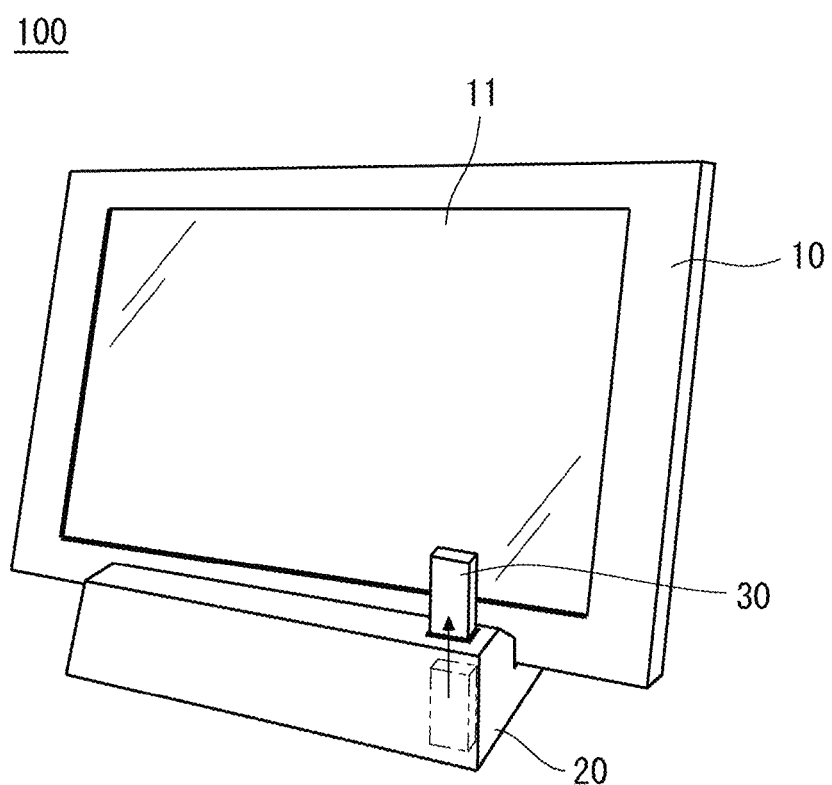
FIG. 4 is a diagram showing an overall configuration of an image display device according to a second embodiment.

The optical sensor 30 is fixed to the cradle 20 in the first embodiment, but an optical sensor 30 is movable in a second embodiment. With reference to FIG. 4, an image display device 100 according to the second embodiment is described.

The optical sensor 30 is provided movably upward and downward. To perform measurement for image quality adjustment, the optical sensor 30 moves upward (in the arrow direction). That is, as the optical sensor 30 moves over a display 11, the optical sensor 30 can receive display light. Similarly to the first embodiment, a correction unit 104 performs display control based on a light receiving result by the optical sensor 30.

In addition, when the measurement for image quality adjustment is completed, the optical sensor 30 moves downward. The optical sensor 30 moves to the outside of the display 11. Thus, the optical sensor 30 is accommodated in the cradle 20. Even when a tablet terminal 10 is placed on the cradle 20, it is possible for a user to see the entire display 11. That is, since the optical sensor 30 moves to the outside of the display screen of the display 11 and does not obstruct the display screen of the display 11.

In the present embodiment, the optical sensor 30 and a mechanism for moving the optical sensor 30 are provided in the cradle 20. Thus, it is possible to reduce the weight and the size of the tablet terminal 10 similarly to the first embodiment. It is possible to adjust the display image quality with a simple configuration.

The optical sensor 30 may moves automatically or manually. For example, when display adjustment is performed, a user may manually move the optical sensor 30. It is only required for the user to pull up the optical sensor 30 from the cradle 20. In this case, the optical sensor 30 is attached to a linear guide mechanism that guides the up and down movement. Alternatively, a switch or the like that detects that a user has moved the optical sensor 30 may be provided. When it is detected that the optical sensor 30 has moved to a position where display light can be received, a correction control unit 101 starts measurement. That is, when a user moves the optical sensor 30, measurement is started. Accordingly, it is possible to perform correction without requiring a user to operate a touch panel.

Alternatively, a moving mechanism that moves the optical sensor 30 using the weight of the tablet terminal 10 may be provided. In this case, when the tablet terminal 10 is placed on the cradle 20, the optical sensor 30 automatically moves upward by the moving mechanism. When the optical sensor 30 moves upward, the correction control unit 101 starts measurement. Accordingly, it is possible to perform correction without requiring a user to operate a touch panel.

By providing an actuator, such as a motor, in the cradle 20, the optical sensor 30 may be moved. In this case, by a user touch-operating the tablet terminal 10, the actuator moves the optical sensor 30. Alternatively, a switch or a sensor that detects that the tablet terminal 10 is placed on the cradle 20 may be provided. For example, an electronic, magnetic, or optical element, such as a micro switch, may be used to detect the placement of the tablet terminal 10. Then, the actuator may move the optical sensor 30 according to the detection result.

Moreover, by detecting that the tablet terminal 10 is placed on the cradle 20, display adjustment may be automatically performed. The optical sensor 30 automatically moves to a position where display light can be received according to the detection result by the switch or the like. Alternatively, when charging is started, the optical sensor 30 may move. Then, when the measurement is completed or when the tablet terminal 10 is detached from the cradle 20, the optical sensor 30 moves downward. Accordingly, it is possible to improve convenience. In addition, display adjustment may be regularly performed.

Third Embodiment

Figure 5:
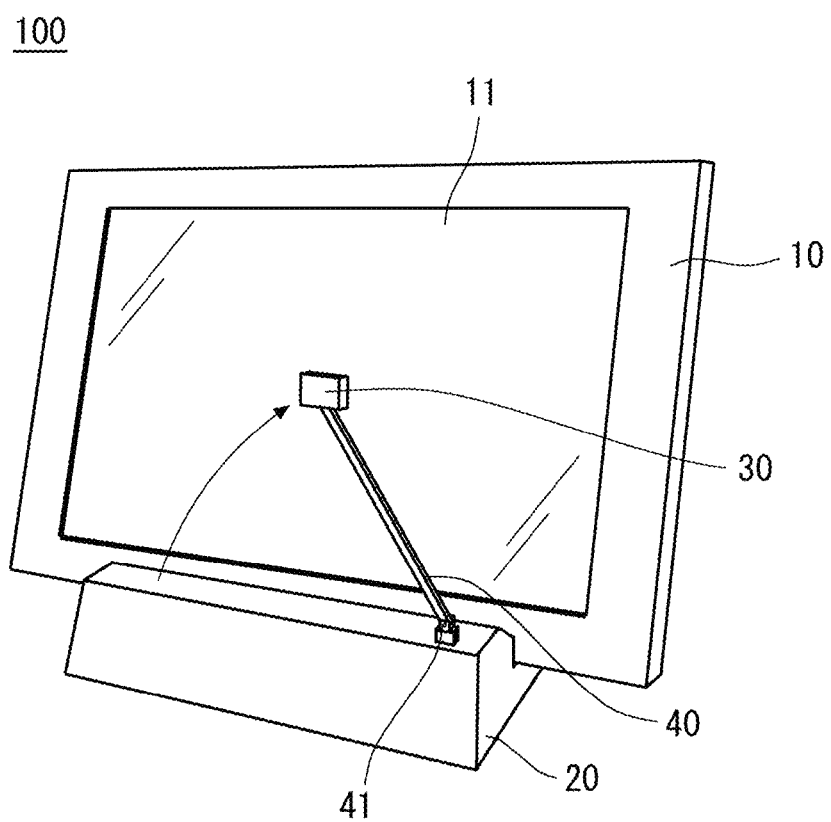
FIG. 5 is a diagram showing an overall configuration of an image display device according to a third embodiment.

In the present embodiment, a cradle 20 has an arm 40 as shown in FIG. 5. The arm 40 supports an optical sensor 30. Note that, the configuration other than the arm 40 is similar to that in the first and second embodiments, and the description is omitted as appropriate.

The arm 40 is provided between the cradle 20 and the optical sensor 30. The arm 40 has a first end (tip end) provided with the optical sensor 30 and a second end (base end) attached to the cradle 20. The arm 40 has a rotation shaft 41 at the base end on the cradle 20. The optical sensor 30 is attached to the cradle 20 via the arm 40.

The arm 40 extends in parallel to the surface of a display 11. The arm 40 is a rotating arm that rotates in the arrow direction around the rotation shaft 41 as a rotation center. That is, the optical sensor 30 moves in an arc around the rotation shaft 41. The optical sensor 30 rotates and moves over the display 11 of a tablet terminal 10.

In this manner, it is possible to move the optical sensor 30 from the outside to the front of the display 11. To perform measurement for image quality adjustment, the arm 40 rotates to move the optical sensor 30 to the front of the display 11. When the measurement is completed, the optical sensor 30 is moved to the outside of the display 11. Note that, the optical sensor 30 preferably passes through the center of the display 11 by setting the length of the arm 40 and the position of the rotation shaft 41. Here, passing through the center of the display 11 does not only mean passing through a single point in the center, but also includes passing through a part of a rectangle, a regular circle, an ellipse, or the like having a predetermined area including the center.

By changing the rotation angle of the arm 40, the optical sensor 30 moves over the display screen of the display 11. Within the display screen of the display 11, a light receiving position of the optical sensor 30 can be changed. The optical sensor 30 detects display light at each light receiving position. A correction unit 104 performs correction according to a detection result of display light at a plurality of light receiving positions.

In this manner, it is possible to control the variance in the luminance distribution of the display 11. For example, the optical sensor 30 receives display light at each of the center and the end portion of the display 11. Then, by comparing the light receiving result at the center with the light receiving result at the end portion, it is possible to correct the variance in the luminance distribution. It is possible to control the luminance unevenness (deterioration of uniformity) of the display screen. In this case, a sensor or a mechanism that detects the rotation angle of the arm 40 may be provided. That is, it is possible to identify a detection position over the display 11 according to the rotation angle of the arm 40. Then, a correction control unit 101 generates a correction signal by associating the rotation angle with screen luminance information. The correction unit 104 divides the display area of the display 11 into a plurality of areas to adjust the luminance.

For example, while the display 11 displays a uniform gray pattern, the optical sensor 30 detects display light at each of the end portion and the center. If the detection luminance at the end portion is lower than the detection luminance at the center, the correction control unit 101 generates a correction signal to relatively increase the display luminance at the end portion.

The arm 40 may rotate manually or automatically. In the case of manual rotation, a user rotates the arm 40 around the rotation shaft.

Accordingly, it is possible to change the position of the optical sensor 30. The cradle 20 may be provided with an actuator that rotates the arm 40 to automatically move the arm 40.

To start measurement, a trigger similar to the first and second embodiments can be used. For example, measurement may be started by touch operation. Alternatively, by detecting that the tablet terminal 10 is placed on the cradle 20, measurement may be started automatically.

In addition, the arm 40 may not be a rotating arm but an extendable arm. That is, by extending and retracting the arm 40, a light receiving position of the optical sensor 30 may be changed. Moreover, the arm 40 may extend, retract, and rotate. In this manner, it is possible to move the optical sensor 30 to any position over the display 11.

In the present embodiment, the arm 40 and the optical sensor 30 are provided on the cradle 20. Thus, it is possible to reduce the weight and the size of the tablet terminal 10 similarly to the first and second embodiments. It is possible to adjust the display image quality with a simple configuration.

Fourth Embodiment

Figure 6:
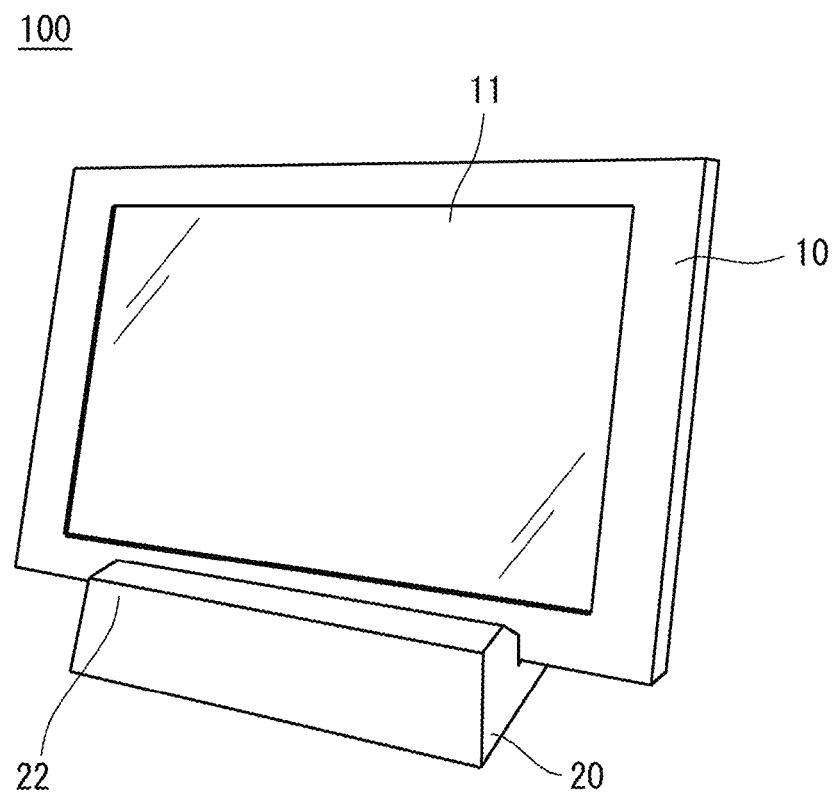
FIG. 6 is a diagram showing an overall configuration of an image display device according to a fourth embodiment.
Figure 7:
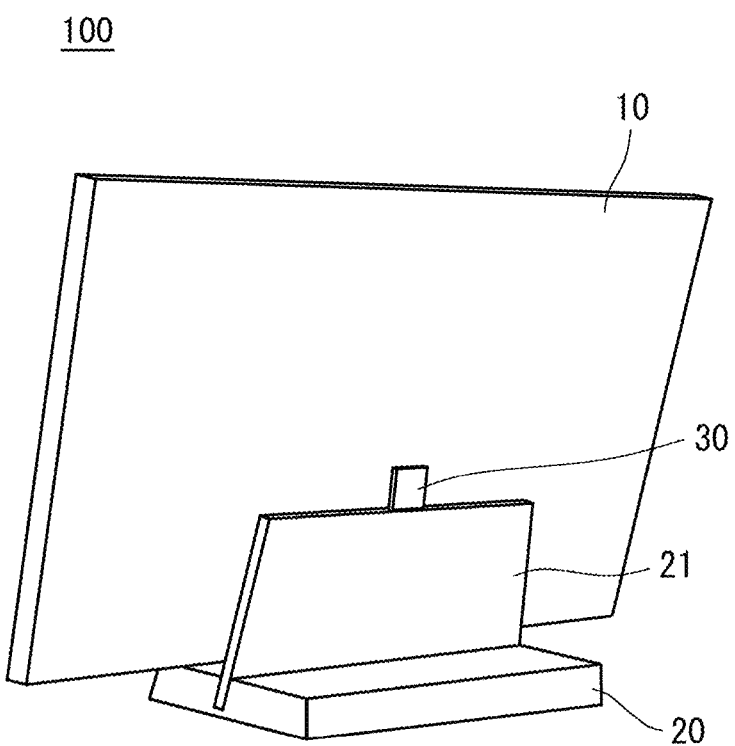
FIG. 7 is a diagram showing the overall configuration of the image display device according to the fourth embodiment.

With reference to FIGS. 6 and 7, an image display device 100 according to a fourth embodiment is described. FIG. 6 is a perspective view schematically showing a configuration of the image display device 100. FIG. 6 is a diagram showing a cradle 20 on which a tablet terminal 10 is placed when viewed from the front side. FIG. 7 is a diagram showing the cradle 20 on which the tablet terminal 10 is placed when viewed from the back side.

The cradle 20 is provided with a front-side support part 22 and a back-side support part 21. The front-side support part 22 supports the front side of the tablet terminal 10, and the back-side support part 21 supports the back side of the tablet terminal 10. By placing the tablet terminal 10 between the front-side support part 22 and the back-side support part 21, the cradle 20 holds the tablet terminal 10.

Moreover, the tablet terminal 10 can be placed on the cradle 20 with the front side and the back side reversed. That is, the cradle 20 can hold the tablet terminal 10 while a display 11 faces the back-side support part 21.

On the upper side of the back-side support part 21, an optical sensor 30 is provided. The optical sensor 30 protrudes upward from the back-side support part 21. As described above, the tablet terminal 10 can be reversibly placed on the cradle 20 so that the front side of the tablet terminal 10 faces the back-side support part of the cradle 20. A user places the tablet terminal 10 on the cradle 20 in such a manner that the back-side support part 21 faces the display 11 and that the front-side support part 22 faces the back side of the tablet terminal 10. In this manner, it is possible for the optical sensor 30 to receive display light from the display 11. Thus, it is possible to perform measurement similarly to the first to third embodiments.

The back-side support part 21 of the cradle 20 is higher than the front-side support part 22. That is, the front-side support part 22 of the cradle 20 is lower than the lower end of the display 11 in such a manner as not to obstruct the display 11. In contrast, the back-side support part 21 can be higher than the lower end of the display 11. Thus, the back-side support part 21 protrudes to be higher than the front-side support part 22.

By providing the optical sensor 30 on the back-side support part 21, it is possible to arrange the optical sensor 30 at the center or near the center of the display 11. That is, it is possible for the optical sensor 30 to detect display light at the center position of the display 11. Accordingly, it is possible to more appropriately perform image quality adjustment.

A switch or the like that detects that the tablet terminal 10 is placed with the front side and the back side reversed may be provided on the cradle 20. For example, a magnet switch or a mechanical switch is used to detect that the tablet terminal 10 is placed with the front side and the back side reversed. Then, if it is detected that the tablet terminal 10 is placed with the front side and the back side reversed, measurement is performed. In other words, if the display 11 is placed to face the front-side support part 22, measurement is not performed. In this manner, it is possible to improve convenience.

Figure 8:
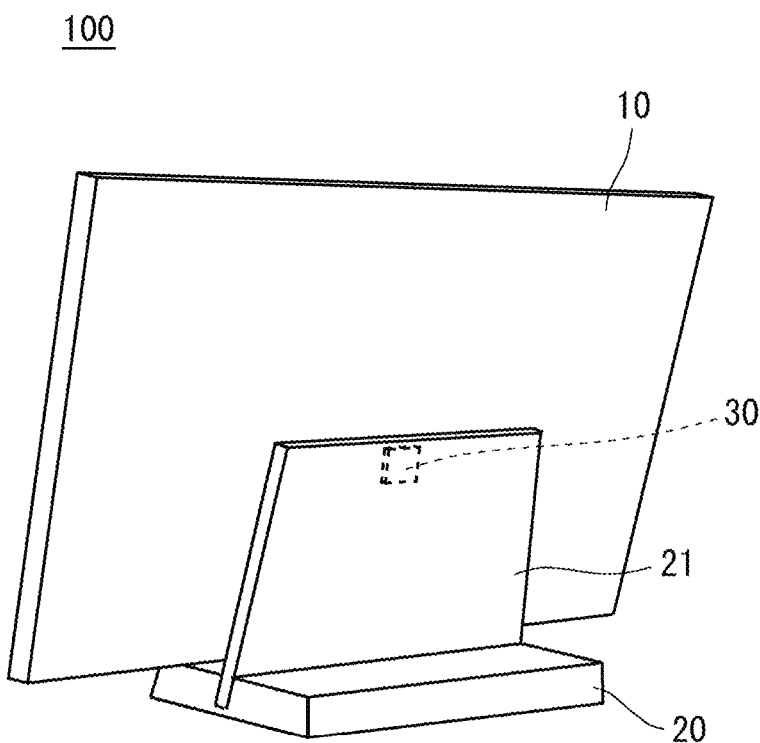
FIG. 8 is a diagram showing an overall configuration of an image display device according to another aspect of the fourth embodiment.

The optical sensor 30 is not limited to the configuration in which the optical sensor 30 protrudes upward from the back-side support part 21. For example, the optical sensor 30 may be provided as shown in FIG. 8. In FIG. 8, the optical sensor 30 does not protrude from the back-side support part 21 and is built into the back-side support part 21. The optical sensor 30 is provided on the front side of the back-side support part 21, that is, to face the tablet terminal 10. Thus, when the tablet terminal 10 is placed on the cradle 20 with the front side and the back side reversed (when the display screen faces the optical sensor 30 built in the back-side support part 21), the optical sensor 30 detects display light at the center position of the display 11. Since the back-side support part 21 has a height reaching the center or the vicinity of the center of the display 11, it is possible to provide the optical sensor 30 in the back-side support part 21. Accordingly, it is possible to improve designability.

Other Embodiments

In the first to fourth embodiments, one optical sensor 30 is provided on the cradle 20. However, a cradle 20 may be provided with a plurality of optical sensors 30. For example, both optical sensors 30 described in the first and fourth embodiments may be provided on the cradle 20. Moreover, a plurality of optical sensors 30 may be provided on a front-side support part 22. Alternatively, a plurality of optical sensors 30 may be provided on a back-side support part 21. In this manner, it is possible to perform measurement at a plurality of position of the display 11 as light receiving positions. By providing a plurality of optical sensors 30, it is possible to perform measurement at a plurality of positions over the display 11 without a moving mechanism that moves the optical sensor 30.

Figure 9:
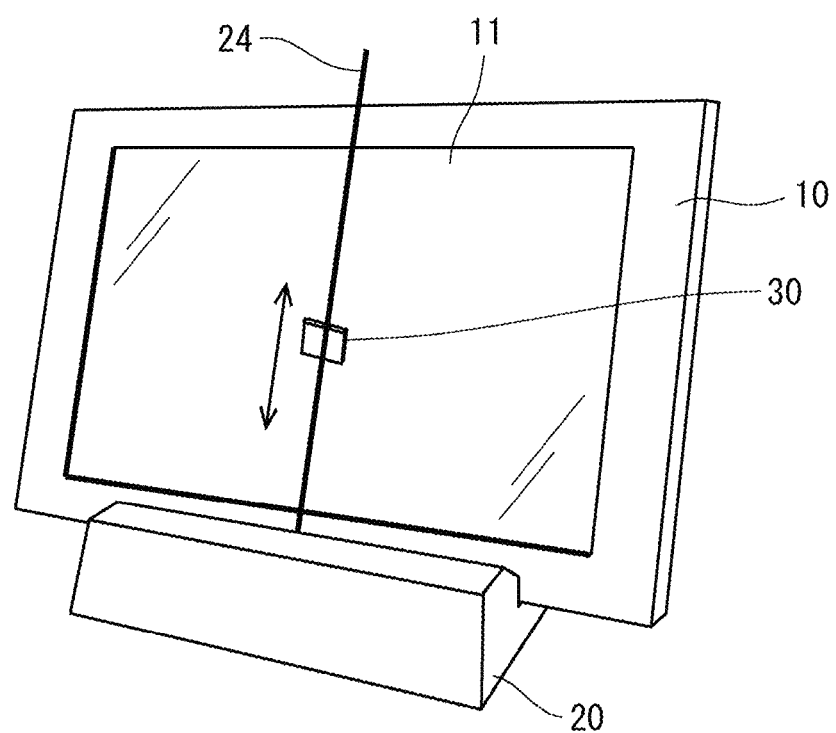
FIG. 9 is a diagram showing an overall configuration of an image display device according to other embodiments.

Note that, the configuration for moving the optical sensor 30 is not limited to the configurations in the second and third embodiments. For example, as shown in FIG. 9, a wire 24 drawn out from the cradle 20 is used to move the optical sensor 30. In this case, the wire 24 passes through a through hole provided in the optical sensor 30.

A user can move the optical sensor 30 along the wire 24 (in the arrow direction in FIG. 9). During measurement, the user holds the wire 24 in a tensioned state. Then, the user moves the optical sensor 30 along the wire 24 to an appropriate position to perform measurement. Thus, it is possible to adjust the display image quality with a simple configuration. In addition, it is possible to set any position over the display 11 as a light receiving position. While measurement is not performed, the wire 24 is winded and accommodated in the cradle 20.

In addition, one cradle 20 may support a plurality of tablet terminals 10. The plurality of tablet terminals 10 may be a plurality of types of tablet terminals with different screen sizes or display characteristics. The plurality of tablet terminals 10 may share the one cradle. For example, two tablet terminals 10 may be alternately placed on the one cradle 20. In this case, the one cradle 20 can perform image quality adjustment of the plurality of tablet terminals 10. The one cradle 20 can perform adjustment in such a manner that the image quality of the plurality of tablet terminals 10 is equivalent. For example, the one cradle 20 can adjust the display luminance of one tablet terminal 10 in such a manner as to be equivalent to the display luminance of another tablet terminals 10.

In addition, the image display device 100 may store, for each of the plurality of types of tablet terminals, profile information, such as the position, the measurement point, and the screen display characteristic control method of the optical sensor 30 that measures the screen. Then, the correction control unit 101 may detect the type of a placed tablet terminal 10 and read the profile information to apply it to correction. Accordingly, a user is not required to manually perform settings related to display image quality correction according to the type of the tablet terminal 10 placed on the cradle, and these settings are performed automatically.

Figure 10:
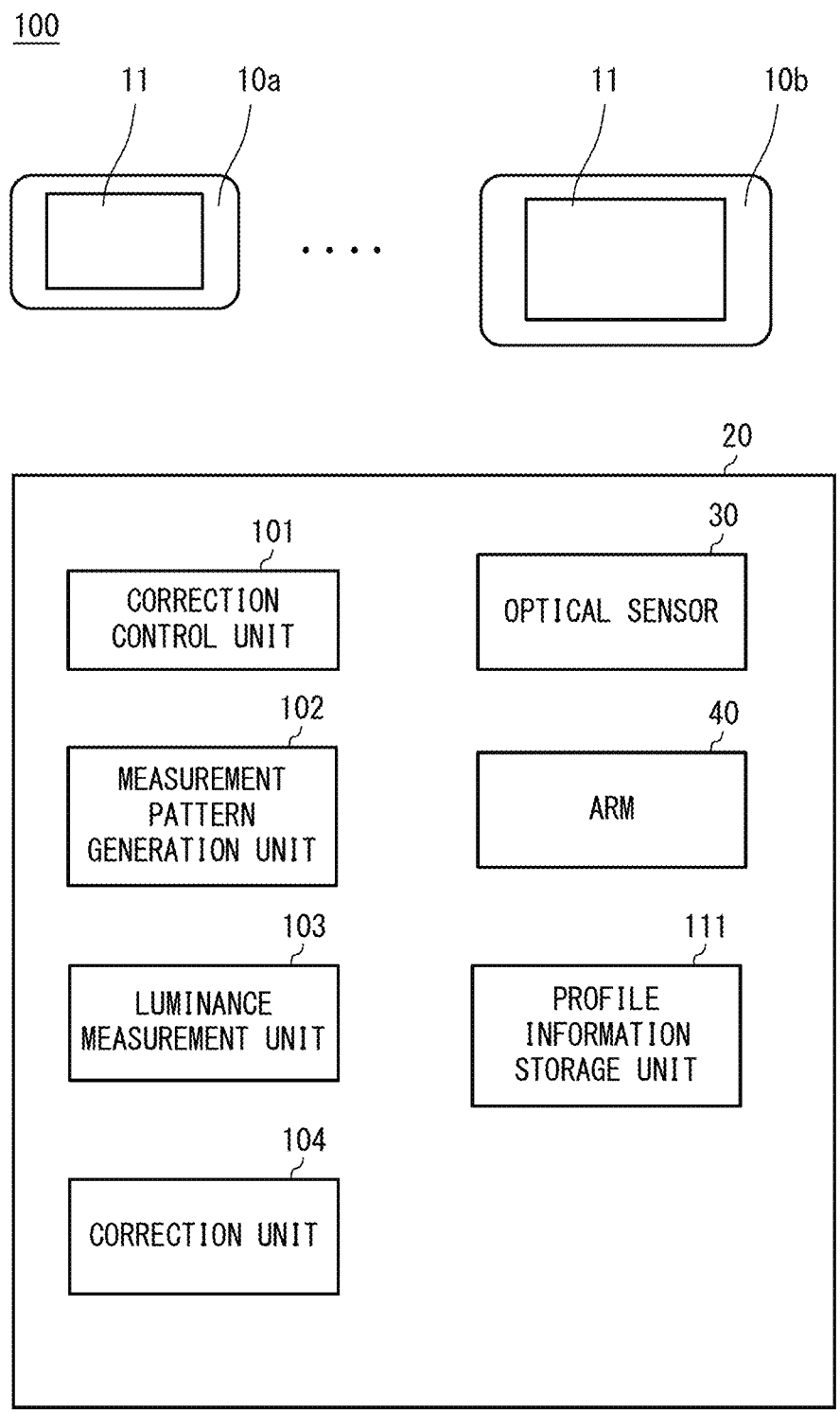
FIG. 10 is a control block diagram showing a configuration of an image display device according to other embodiments.

A suitable embodiment in this case is described with reference to FIG. 10. FIG. 10 is a block diagram showing a configuration of an image display device 100. Here, an optical sensor 30 is movable by an arm 40 as described in the third embodiment. A cradle 20 can hold a plurality of types of tablet terminals 10. Here, the cradle 20 distinguishes holdable tablet terminals as tablet terminals 10a and 10b. Note that, the description common to the first to fourth embodiments is omitted as appropriate.

The tablet terminals 10a and 10b are of different types. Specifically, the size of the display 11 of the tablet terminal 10a is different from that of the tablet terminal 10b. The cradle 20 can detect the types of the tablet terminals 10a and 10b. The cradle 20 is provided with a profile information storage unit 111.

The profile information storage unit 111 is a memory or the like and stores profile information for each of the types of the tablet terminals 10a and 10b. For example, the profile information is a measurement position of the optical sensor 30 with respect to the display 11. Specifically, the profile information storage unit 111 stores, for each size of the display 11, the rotation angle and the extension/retraction amount of the arm 40 that is the measurement position. Alternatively, the profile information storage unit 111 may store the coordinates of the display 11 that is the measurement position. Naturally, the optical sensor 30 may detect display light of one tablet terminal 10a at two or more measurement positions.

When a tablet terminal 10 is placed on the cradle 20, a correction control unit 101 of the cradle 20 detects the type of the tablet terminal 10. The correction control unit 101 refers to the profile information corresponding to the detected type to drive the arm 40. The arm 40 operates to move the optical sensor 30 to a measurement position of the display 11. When the optical sensor 30 detects display light at the measurement position indicated by the profile information, the measurement is completed. Then, a correction unit 104 corrects the display characteristic based on the measurement result. The measurement and correction control are similar to the above, and the description is omitted.

The profile information storage unit 111 stores profile information for each of the types of tablet terminals 10. When acquiring the type of a tablet terminal 10, the correction control unit 101 controls, according to the profile information, the position of the optical sensor 30 with respect to the display 11. Thus, it is possible to perform measurement at an appropriate measurement position for each of displays 11 with different sizes. Thus, it is possible to perform appropriate correction for each of the different types of the tablet terminals 10a and 10b that are of different types. In addition, detection of the types of the tablet terminals 10, driving of the arm 40, and the like may be performed automatically. Accordingly, a user is not required to perform setting related to display image quality correction, and it is possible to improve convenience.

Note that, the profile information stored in the profile information storage unit 111 may include information other than the measurement position of the optical sensor 30. The profile information may include a method for controlling a display characteristic. That is, the display control method may be different for each of the types of tablet terminals 10. Specifically, the luminance of the tablet terminal 10a may be adjusted, and the gamma characteristic of the tablet terminal 10b may be adjusted. Alternatively, the display gradation or display luminance of the measurement pattern may be changed for each tablet terminal. The profile information may include information related to the performance of the display 11. Moreover, the types of the tablet terminals 10 are not limited to two and may be classified into three or more.

In addition, the profile information storage unit 111 is provided on the cradle 20 in the above description, but the profile information storage unit 111 may be provided on an element other than the cradle 20. For example, the profile information storage unit 111 may be provided on the tablet terminals 10. Alternatively, the profile information storage unit 111 may be provided in a server device that manages a plurality of tablet terminals 10 or the like. In this case, the tablet terminals 10, the server device, or the like transmits the profile information to the correction control unit 101.

Fifth Embodiment

Figure 11:
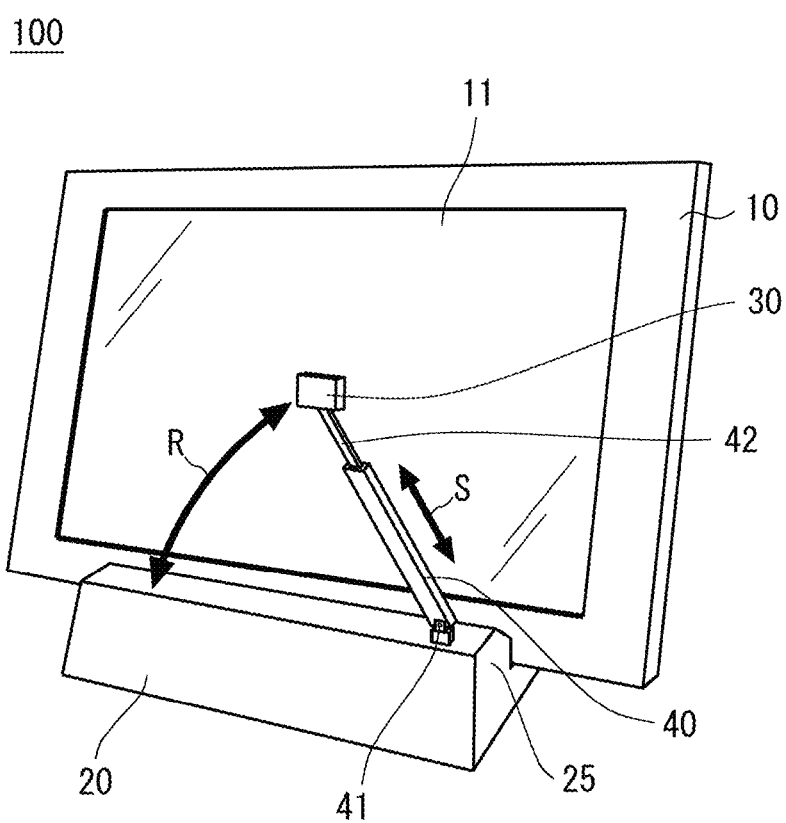
FIG. 11 is a diagram showing an overall configuration of an image display device according to a fifth embodiment.

With reference to FIG. 11, an image display device 100 according to the present embodiment is described. FIG. 11 is a diagram showing the image display device 100. FIG. 11 is a perspective view of a tablet terminal 10 when viewed from the front side. The description common to the above embodiments is omitted. A cradle 20 has a holding part 25 for holding the tablet terminal 10. The holding part 25 corresponds to a back-side support part 21 and a front-side support part 22. An optical sensor 30 detects display light from a display 11. The uniformity correction for the display 11 is performed based on a detection result by the optical sensor 30.

The cradle 20 has an arm 40. The arm 40 supports the optical sensor 30. The optical sensor 30 is attached to the arm 40. The arm 40 is provided between the cradle 20 and the optical sensor 30. The arm 40 has a first end (tip end) provided with the optical sensor 30 and a second end (base end) attached to the cradle 20. The arm 40 has a rotation shaft 41 at the base end on the cradle 20. The optical sensor 30 is attached to the cradle 20 via the arm 40.

The arm 40 is a movable mechanism that moves a light receiving position of the optical sensor 30 with respect to the display 11. For example, the arm 40 is provided with an actuator such as a motor. Then, by driving the actuator, the optical sensor 30 is moved.

The arm 40 extends in parallel to the surface of the display 11. The arm 40 is a rotating arm that rotates in the direction of the arrow R around the rotation shaft 41 as a rotation center. That is, the optical sensor 30 moves in an arc around the rotation shaft 41. The optical sensor 30 rotates and moves over the display 11 of the tablet terminal 10.

Moreover, the arm 40 is an extendable arm having an extendable part 42. By sliding and moving the extendable part 42 in the arm direction, the arm 40 is extended and retracted in the direction of the arrow S. Thus, the length of the arm 40 is changed, and the distance between the optical sensor 30 and the rotation shaft 41 is changed.

In this manner, the optical sensor 30 is moved along the surface of the display 11 by the movement of the arm 40. Specifically, the arm 40 is provided with actuators that change the rotation angle and the extension/retraction amount. Note that, the arm 40 that can extend, retract, and rotate is used as the movable mechanism in the above description, but the movable mechanism is not limited to the configuration in FIG. 11.

The optical sensor 30 can be moved by the arm 40 from the outside to the front of the display 11. Moreover, the arm 40 can change the light receiving position of the optical sensor 30. By controlling the rotation angle and the extension/retraction amount of the arm 40, it is possible to move the optical sensor 30 to any position over the display 11. By changing the light receiving position of the optical sensor 30, it is possible to measure the luminance distribution (uniformity characteristic) of the display 11.

Figure 12:
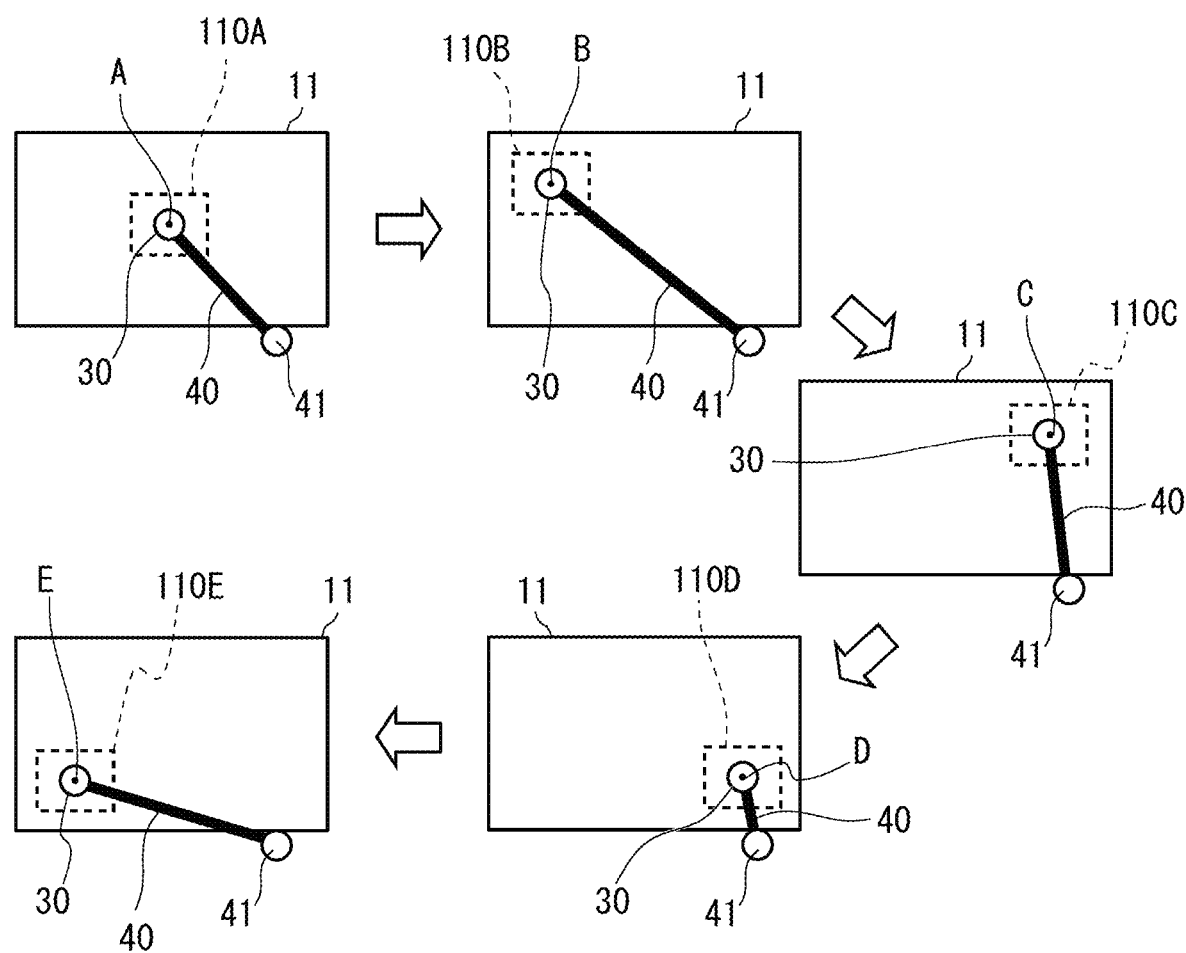
FIG. 12 is a schematic diagram for explaining light receiving positions of an optical sensor over a display.

With reference to FIG. 12, examples of light receiving positions with respect to the display 11 is described. FIG. 12 is a schematic diagram for explaining the light receiving positions of the optical sensor 30 with respect to the display 11. In FIG. 12, the image display device 100 is simplified. For example, the cradle 20, the extendable part 42, and the like are omitted in FIG. 12

In FIG. 12, the arm 40 moves the optical sensor 30 to light receiving positions A to E. That is, by changing the rotation angle and the extension/retraction amount of the arm 40, the optical sensor 30 is moved in the order of the light receiving positions A to E. Then, the optical sensor 30 detects display light at the light receiving positions A to E. Here, the light receiving position A corresponds to the center of the display 11. The light receiving positions B to E correspond to the vicinities of the four corners of the display 11. Naturally, the position and numbers of light receiving positions of the optical sensor 30 are not limited to the examples in FIG. 12.

For example, while the optical sensor 30 faces the display 11 at the light receiving position A, the optical sensor 30 detects display light from the display 11. Accordingly, it is possible to measure the luminance of the display 11 at the center. Similarly, the optical sensor 30 detects display light from the display 11 at the light receiving positions B to E. Accordingly, it is possible to measure the luminance distribution of the display 11. The uniformity correction for the display 11 is performed based on the detection result by the optical sensor 30.

Figure 13:
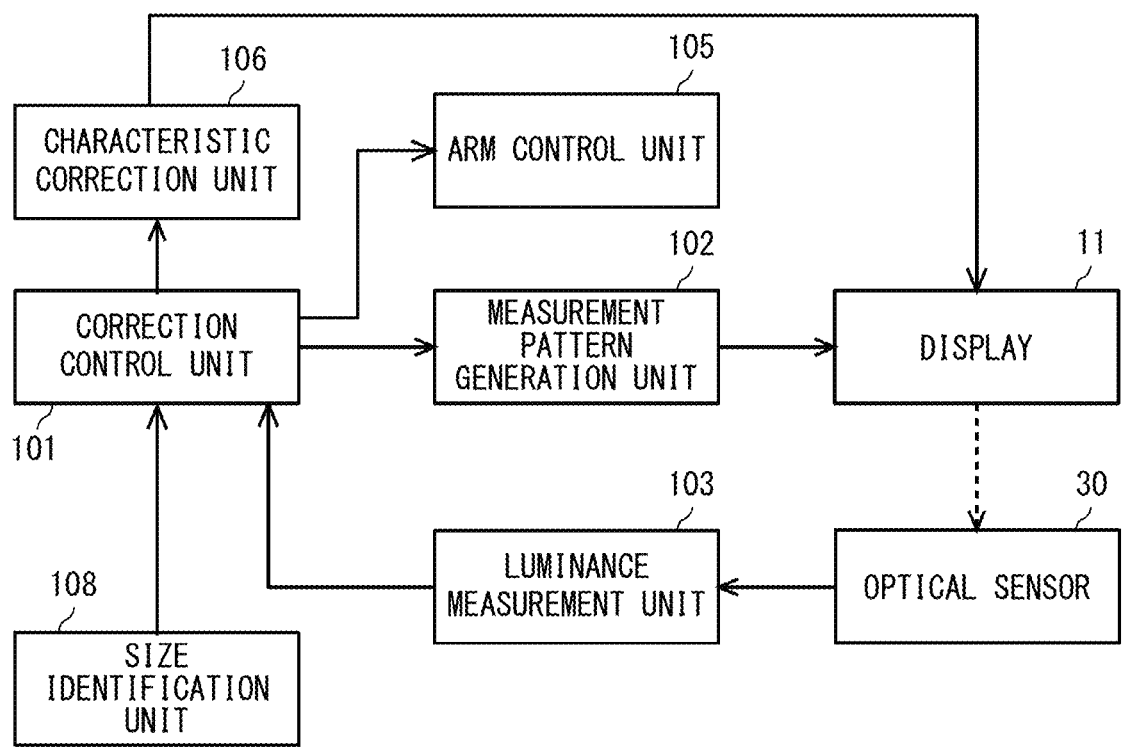
FIG. 13 is a diagram showing a control system of the image display device.

FIG. 13 is a control block diagram showing a control system for performing uniformity correction. The image display device 100 includes a correction control unit 101, a measurement pattern generation unit 102, the display 11, the optical sensor 30, a luminance measurement unit 103, an arm control unit 105, a characteristic correction unit 106, and a size identification unit 108. The correction control unit 101 controls each control block to perform uniformity correction.

The arm control unit 105 receives a command from the correction control unit 101. The arm control unit 105 controls the arm 40 based on the command from the correction control unit 101. The arm control unit 105 outputs a control signal for controlling an actuator, such as a motor. By driving the actuator of the arm 40, the arm 40 is rotated or extended/retracted. Thus, the optical sensor 30 is moved in the order of the light receiving positions A to E as shown in FIG. 12.

The measurement pattern generation unit 102 generates a measurement pattern based on the command from the correction control unit 101. The display 11 displays the measurement pattern. While the measurement pattern is displayed, the optical sensor 30 detects display light from the display 11. The luminance measurement unit 103 measures the detection luminance of the optical sensor 30 in association with each light receiving position. By the optical sensor 30 detecting display light at a plurality of light receiving positions, it is possible for the luminance measurement unit 103 to measure the luminance distribution (uniformity) of the display 11. The characteristic correction unit 106 corrects the uniformity characteristic according to the measurement result of the detection luminance.

The measurement pattern is, for example, a uniform gray pattern in at least a part of the area of the display screen. That is, measurement pattern is an image with a uniform gradation level in the vicinity of a measurement point (light receiving position) of the optical sensor 30.

For example, the areas in the vicinities of measurement points are referred to as measurement areas 110A to 110E as shown in FIG. 12. In the measurement areas 110A to 110E, the display 11 is at the uniform gradation level. In each of the measurement areas 110A to 110E, a uniform gray pattern is displayed. When the center of the display 11 is at the light receiving position A, the vicinity of the center of the display 11 is the measurement area 110A. The measurement area 110A includes the light receiving position A. For example, the measurement area 110A overlaps with the optical sensor 30 at the light receiving position A. Moreover, the measurement area 110A is larger than the optical sensor 30.

In addition, when the upper left corner of the display 11 is at the light receiving position B, the vicinity of the upper left corner of the display 11 is the measurement area 110B. When the upper right corner of the display 11 is at the light receiving position C, the vicinity of the upper right corner of the display 11 is the measurement area 110C. When the lower right corner of the display 11 is at the light receiving position D, the vicinity of the lower right corner of the display 11 is the measurement area 110D. When the lower left corner of the display 11 is at the light receiving position E, the vicinity of the lower left corner of the display 11 is the measurement area 110E.

In this manner, the positions of the measurement areas 110A to 110E are changed according to the light receiving positions A to E of the optical sensor 30. That is, every time the light receiving position is changed, the measurement pattern is switched. The measurement pattern generation unit 102 generates a measurement pattern that changes according to the light receiving position. The positions of the measurement areas of the display 11 are associated with the rotation angles and the extension/retraction amounts of the arm 40.

The centers of the measurement areas 110A to 110E coincide with the light receiving positions A to E. The measurement pattern generation unit 102 generates a measurement pattern in such a manner that each measurement area matches its light receiving position. Thus, it is possible for the optical sensor 30 to detect display light from the measurement areas. That is, while a uniform gray pattern is displayed in each measurement area, the optical sensor 30 detects display light from the measurement area.

Note that, in the areas other than the measurement areas 110A to 110E, the display 11 may be, for example, in black. Naturally, the areas other than the measurement areas may not be in black. Note that, all the measurement areas 110A to 110E are the rectangular areas having the same size in FIG. 12. Naturally, the measurement areas 110A to 110E may be any shape other than a rectangle (for example, polygons other than a rectangle, a circle, an ellipse, or the like) and may be of different sizes and different shapes.

Moreover, the measurement pattern generation unit 102 generates a plurality of gray patterns with different gradation levels by switching them at fixed intervals. The gradation levels gradually change from, for example, black to white over time. For example, the gradation levels of the gray patterns are switched in the order of G1, G2, . . . , to Gn (n is an integer of 2 or more) in the measurement area 110A. The optical sensor 30 detects display light at each of the gradation levels G1 to Gn. Thus, measurement at the light receiving position A is completed.

Next, in order to perform measurement at the light receiving position B, the arm 40 moves the optical sensor 30 to the light receiving position B. Then, the gradation levels of the gray patterns are switched in the order of G1, G2, . . . , to Gn (n is an integer of 2 or more) in the measurement area 110B. The optical sensor 30 detects display light at each of the gradation levels G1 to Gn. Thus, measurement at the light receiving position B is completed. At the light receiving positions C to E, the measurement pattern generation unit 102 switches the measurement patterns in such a manner that measurement is similarly performed at each of the gradation levels G1 to Gn.

In this manner, the correction control unit 101 controls the arm control unit 105 and the measurement pattern generation unit 102. Thus, the measurement pattern generation unit 102 can generate the measurement pattern according to the light receiving position of the optical sensor 30. That is, the light receiving positions over the display 11 are preset in the correction control unit 101. Then, the correction control unit 101 outputs a command to the arm control unit 105 and the measurement pattern generation unit 102 according to the preset light receiving positions.

The luminance measurement unit 103 measures the detection luminance of the optical sensor 30. The luminance measurement unit 103 measures the detection luminance in association with each light receiving position. That is, the value of the detection luminance is stored for each of the light receiving positions A to E. Moreover, the luminance measurement unit 103 measures the detection luminance in association with each gradation level. That is, the value of the detection luminance is stored for each of the gradation levels G1 to Gn. In this manner, it is possible for the luminance measurement unit 103 to measure the luminance distribution of the display 11.

The detection luminance assumed when the display 11 displays the measurement pattern is referred to as a reference luminance. By comparing the actually detected detection luminance with the reference luminance, the luminance measurement unit 103 calculates screen luminance information. The luminance measurement unit 103 acquires screen luminance information for each light receiving position. That is, the luminance measurement unit 103 calculates, for each light receiving position, the difference between the detection luminance and the reference luminance. The luminance measurement unit 103 acquires screen luminance information for each gradation level. The reference luminance is set for each of the gradation levels G1 to Gn. That is, screen luminance information is calculated for each of the gradation levels G1 to Gn.

The correction control unit 101 outputs a correction signal to the characteristic correction unit 106 based on the screen luminance information. The characteristic correction unit 106 corrects the uniformity characteristic of the display 11 based on the correction signal. The characteristic correction unit 106 may correct the display gradation level to adjust the display luminance distribution. The characteristic correction unit 106 adds or subtracts an offset value to or from the input gradation level or multiplies a gain value (coefficient) by the input gradation level to calculate the display gradation level. If the detection luminance is lower than the reference luminance, the characteristic correction unit 106 outputs a correction signal in such a manner that the display gradation level is higher than the input gradation level.

The characteristic correction unit 106 divides the display screen into a plurality of areas to correct the display gradation level. Here, the plurality of areas is divided according to the plurality of light receiving positions. Alternatively, the display gradation level of the pixels between the light receiving positions may be corrected by interpolation.

In addition, the optical sensor 30 measures the luminance for each gradation level. The characteristic correction unit 106 may identify the gamma characteristic of the display 11 based on the luminance at each gradation level. The characteristic correction unit 106 determines whether the identified gamma characteristic matches a desired gamma characteristic, and corrects, if not, the gamma characteristic of the display 11 to adjust it to the desired display characteristic. Note that, when determining that the identified gamma characteristic matches a predetermined gamma characteristic, the correction unit does not adjust the display characteristic of the display 11. In comparison of gamma characteristics, two characteristics may be determined to be matched if they are within a predetermined range. Accordingly, it is possible to maintain constant display image quality.

Naturally, the colors in addition to the display luminance may be adjusted. For example, if the optical sensor 30 is a sensor that can measure a color characteristic, the optical sensor 30 can detect luminance information about each of RGB and adjust the colors of a display image. In this manner, it is possible to individually and independently correct the display characteristic of each of RGB of the display 11. The sensor that can measure a color characteristic is, for example, a CCD.

In this manner, the characteristic correction unit 106 corrects the uniformity of the display 11 according to the luminance distribution measured by the luminance measurement unit 103. It is possible to control the variance in the luminance distribution of the display 11. For example, the optical sensor 30 receives display light from both the center and the end portion of the display 11. Then, by comparing the light receiving results at the center and the end portion, it is possible to correct the variance in the luminance distribution. It is possible to control the luminance unevenness (deterioration of uniformity) of the display screen. That is, the characteristic correction unit 106 corrects the uniformity in such a manner as to cancel the variation in the luminance distribution.

Figure 14:
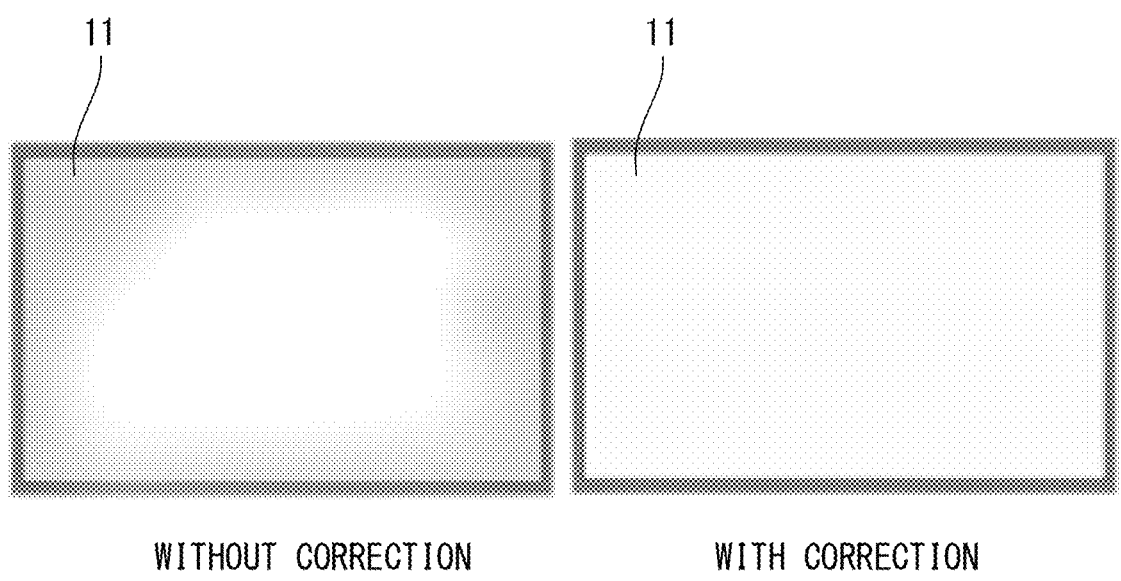
FIG. 14 is a diagram showing the difference in a display image with and without uniformity correction.

FIG. 14 is a diagram showing the difference in a display image with and without uniformity correction. In FIG. 14, the display 11 displays a uniform gray pattern. That is, all the pixels of the display 11 are at the same gradation level. If correction is not performed, the display luminance becomes uneven. By correcting the uniformity, it is possible to display a uniform gray pattern. Accordingly, it is possible to control the unevenness of the display luminance.

In addition, one cradle 20 may support a plurality of tablet terminals 10. The plurality of tablet terminals 10 may be a plurality of types of tablet terminals with different screen sizes or display characteristics. The plurality of tablet terminals 10 may share the one cradle. For example, two tablet terminals 10 may be alternately placed on the one cradle 20. In this case, the one cradle 20 can perform image quality adjustment of the plurality of tablet terminals 10. The one cradle 20 can perform adjustment in such a manner that the image quality of the plurality of tablet terminals 10 is equivalent. For example, the one cradle 20 can adjust the display luminance of one tablet terminal 10 in such a manner as to be equivalent to the display luminance of another tablet terminals 10.

A plurality of tablet terminals 10 of different sizes may be placed on one cradle 20. In this case, the image display device 100 is preferably provided with a size identification unit 108. The size identification unit 108 identifies the size of the display 11 of a tablet terminal 10 placed on the cradle 20. For example, the cradle 20 can hold the plurality of tablet terminals 10 of different sizes. The size identification unit 108 identifies the display size of the placed tablet terminal 10.

The light receiving position for calculating the luminance distribution is changed according to the display size. For example, when the center of the display 11 is the light receiving position of the optical sensor 30, the extension/ retraction amount and the rotation angle of the arm 40 from the rotation shaft 41 to the display 11 are changed according to the display size. Thus, the size identification unit 108 identifies the display size of the tablet terminal 10 held by the cradle 20.

The coordinates of the light receiving position for each display size are set in the correction control unit 101. That is, the rotation angle and the extension/retraction amount for moving the optical sensor 30 to the light receiving position are set for each display size. The correction control unit 101 calculates the rotation angle and the extension/retraction amount of the arm 40 according to the display size identified by the size identification unit 108. Then, the correction control unit 101 outputs a command to the arm control unit 105 in such a manner that the arm 40 has a predetermined rotation angle and a predetermined amount of extension/retraction.

Moreover, the correction control unit 101 outputs a command to the measurement pattern generation unit 102 in such a manner as to display the uniform gray pattern in the measurement area including the light receiving position. That is, the correction control unit 101 determines the coordinates of the measurement area of the display 11 according to the display size. In this manner, even when the plurality of tablet terminals 10 of different sizes shares one cradle 20, it is possible to appropriately perform uniformity correction.

The method by which the size identification unit 108 identifies the display size is not particularly limited. For example, the cradle may be provided with a magnetic, optical, or mechanism sensor to identify the size or model name of a tablet terminal 10. Alternatively, the cradle 20 and a tablet terminal 10 may transmit and receive signals by wired or wireless communication. Then, the cradle 20 acquires, from the tablet terminal 10, terminal type information, such as the model number, model name, and manufacturer name of the tablet terminal 10. The correction control unit 101 identifies the display size according to the terminal type information. In this case, the correction control unit 101 refers to a preset data table to identify the display size. That is, the data table associates the terminal type information with the display size. Naturally, the size identification unit 108 may use a method other than the above to identify the display size.

In this manner, it is possible to more simply correct the uniformity of various tablet terminals 10. It is possible to automatically perform uniformity correction without requiring a user to perform operation such as setting of the light receiving position.

The correction control unit 101, the measurement pattern generation unit 102, the luminance measurement unit 103, the arm control unit 105, the characteristic correction unit 106, and the size identification unit 108 may be provided in each tablet terminal 10.

Alternatively, the correction control unit 101, the measurement pattern generation unit 102, the luminance measurement unit 103, the arm control unit 105, the characteristic correction unit 106, and the size identification unit 108 may be provided in the cradle 20. Moreover, some of the correction control unit 101, the measurement pattern generation unit 102, the luminance measurement unit 103, the arm control unit 105, the characteristic correction unit 106, and the size identification unit 108 may be provided in each tablet terminal 10, and the others may be provided in the cradle 20.

For example, the correction control unit 101, the measurement pattern generation unit 102, and the characteristic correction unit 106 may be provided in a tablet terminal 10, and the luminance measurement unit 103, the arm control unit 105, and the size identification unit 108 may be provided in the cradle 20. In this case, the luminance measurement unit 103 transmits the screen luminance information to the tablet terminal 10 by wired or wireless communication. That is, by transmitting and receiving necessary signals and information between the tablet terminal 10 and the cradle 20, it is possible to distribute the control system between the tablet terminal 10 and the cradle 20.

In addition, some functions of the control blocks may be provided in the tablet terminal 10, and the others may be provided in the cradle 20. For example, the tablet terminal 10 and the cradle 20 may cooperate to perform the function of the correction control unit 101.

The processes of the correction control unit 101, the measurement pattern generation unit 102, the luminance measurement unit 103, the arm control unit 105, the characteristic correction unit 106, and the size identification unit 108 can be performed by a computer program. For example, the tablet terminal 10 stores an application for measurement and correction. The processor of the tablet terminal 10 executes the application to perform the above processes.

Figure 15:
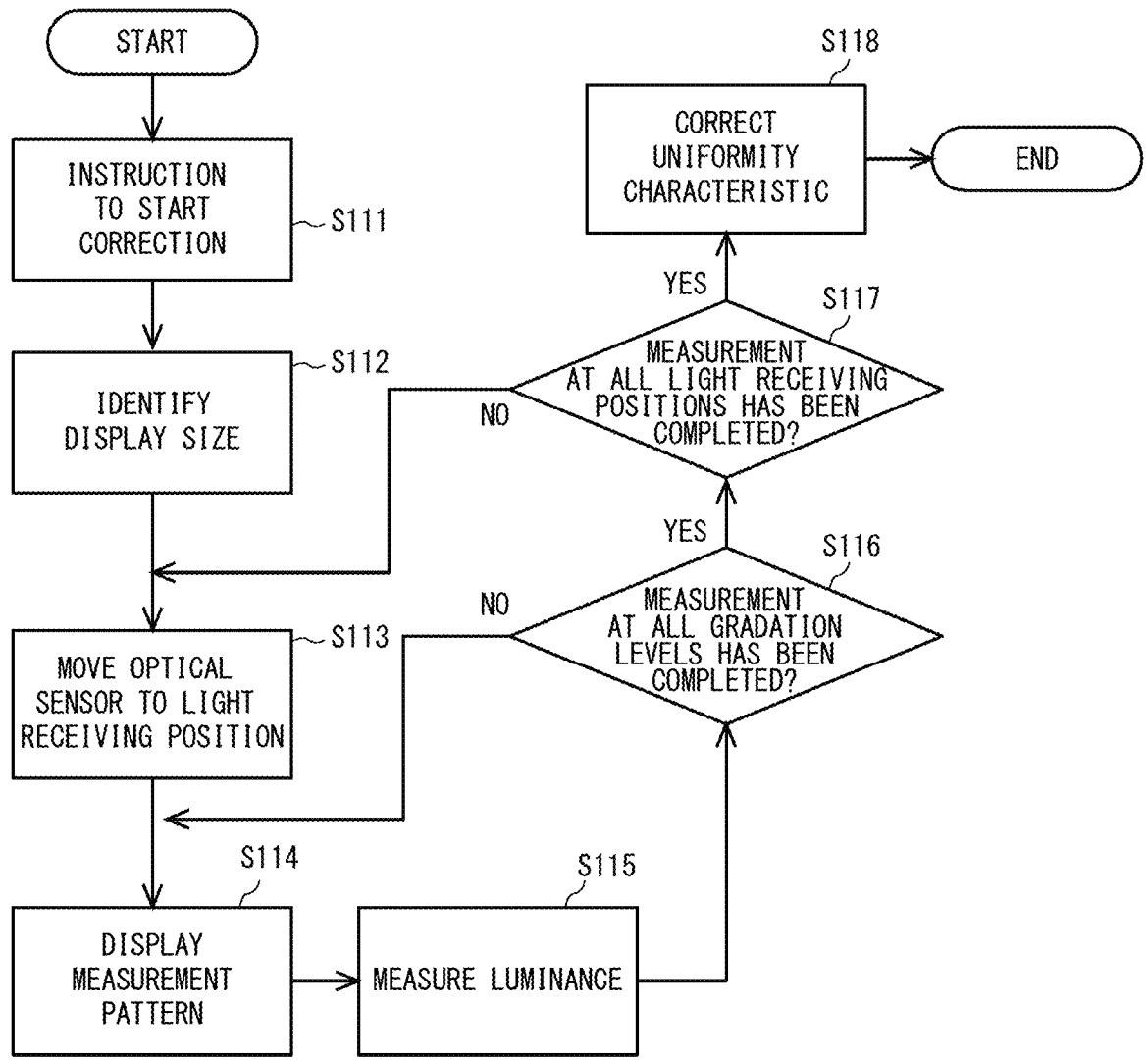
FIG. 15 is a flowchart showing a display control method of the image display device.

FIG. 15 is a flowchart showing a display control method of the image display device 100. First, a user gives an instruction to start correction of a uniformity characteristic (S111). For example, the user operates a touch panel or the like and touches a correction start button. Thus, the correction control unit 101 accepts the instruction to start correction. Alternatively, when the correction control unit 101 detects that the tablet terminal 10 has been placed on the cradle 20, correction may be automatically started. Alternatively, the correction control unit 101 may start correction by triggering the start of charging of the tablet terminal 10.

Next, the size identification unit 108 identifies the display size of the tablet terminal 10 (S112). As described above, various sensors provided on the cradle 20 may measure the size or model of the tablet terminal 10. Alternatively, by transmitting and receiving data between the tablet terminal 10 and the cradle 20, the size identification unit 108 may acquire the terminal type information about the tablet terminal 10.

The optical sensor 30 is moved to the light receiving position (S113). That is, the arm control unit 105 drives the arm 40 in response to a command from the correction control unit 101. Thus, the optical sensor 30 is moved to the light receiving position according to the display size.

The display 11 displays the measurement pattern (S114). That is, the measurement pattern generation unit 102 generates the measurement pattern according to the display size in response to the command from the correction control unit 101. Thus, the uniform gray pattern is displayed in the measurement area including the light receiving position.

The luminance measurement unit 103 measures the luminance at the light receiving position (S115). That is, the optical sensor 30 detects display light from the measurement area. Thus, the luminance measurement unit 103 measures the display luminance at the light receiving position.

Then, the correction control unit 101 determines whether measurement at all the gradation levels has been completed (S116).

When measurement at all the gradation levels has not been completed (NO in S116), the display 11 displays the next measurement pattern (S114). That is, the display 11 displays a measurement pattern at a different gradation level. For example, when measurement at the gradation level G1 has been completed, the measurement pattern generation unit 102 generates the measurement pattern at the next gradation level G2. Then, until measurement at all the gradation levels G1 to Gn has been completed, the processes in S114 to S116 are repeated.

When measurement at all the gradation levels has been completed (YES in S116), it is determined whether measurement at all the light receiving positions has been completed (S117). When measurement at all the light receiving positions has not been completed (NO in S117), the optical sensor 30 is moved to the next light receiving position (S113). For example, when measurement at the light receiving position A has been completed, the arm 40 moves the optical sensor 30 to the light receiving position B (see FIG. 2). Then, until measurement at all the light receiving positions A to E has been completed, the processes in S113 to S117 are repeated.

When measurement at all the light receiving positions has been completed (YES in S117), the characteristic correction unit 106 corrects the uniformity characteristic (S118). That is, the characteristic correction unit 106 calculates an offset value and a gain value for correcting the display gradation level. Then, the characteristic correction unit 106 sets the offset value and the gain value in the tablet terminal 10. In this manner, it is possible to appropriately correct the uniformity. Thus, it is possible to appropriately display a normal display image.

Since the optical sensor 30 is provided on the cradle 20, it is possible to reduce the size and the weight of the tablet terminal 10. It is possible to adjust the display image quality with a simple configuration. In addition, when the tablet terminal 10 is used, a user detaches the tablet terminal 10 from the cradle 20. Since the measurement for adjustment is not performed while the tablet terminal 10 is used, there is no problem that the optical sensor 30 is provided on the cradle 20.

In addition, the optical sensor 30 is arranged to be positioned at an end portion of the display 11. The optical sensor 30 is preferably in close contact with the display 11. In this manner, it is possible to prevent ambient light, such as room light, from entering the optical sensor 30.

In addition, when measurement is completed, the optical sensor 30 may move downward. The optical sensor 30 moves to the outside of the display 11. Thus, the optical sensor 30 is accommodated in the cradle 20. Even when the tablet terminal 10 is placed on the cradle 20, it is possible for a user to see the entire display 11. That is, since the optical sensor 30 moves to the outside of the display screen of the display 11 and does not obstruct the display screen of the display 11.

Sixth Embodiment

Figure 16:
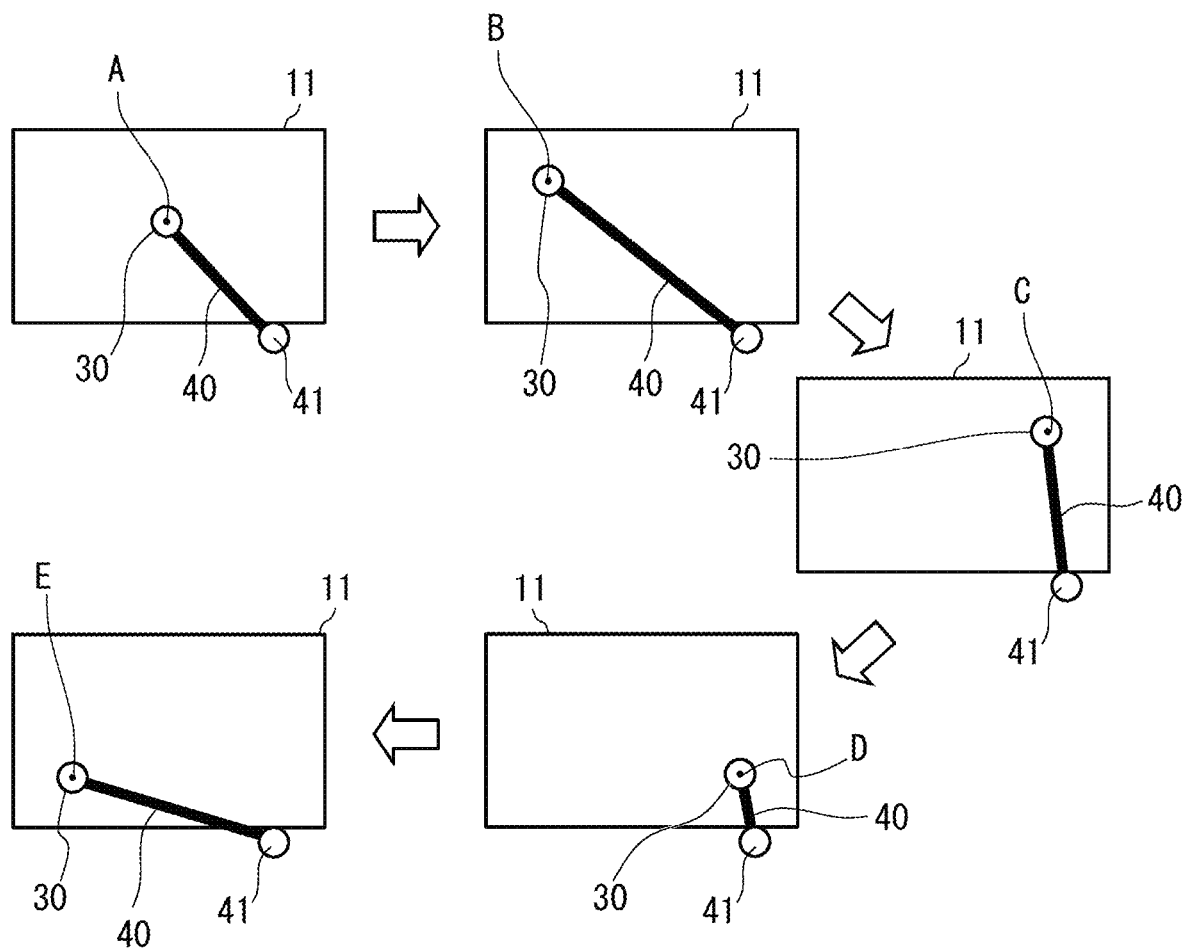
FIG. 16 is a schematic diagram showing a measurement pattern for an image display device according to a sixth embodiment.

In the present embodiment, a measurement pattern generated by a measurement pattern generation unit 102 is different from that in the fifth embodiment. Note that, the configuration and the control other than the measurement pattern are similar to those in the fifth embodiment, and the description is omitted as appropriate. An image display device according to the sixth embodiment and its display control method are described with reference to FIG. 16.

In the present embodiment, a measurement pattern that is a uniform gray pattern over the entire display screen is used. In other words, all the pixels of a display 11 are at the same gradation level. Then, the entire display screen is gradually changed from black to white over time. Similarly to the first embodiment, while the display 11 displays the measurement pattern, an optical sensor 30 detects display light.

In the present embodiment, it is unnecessary to move a measurement area according to a light receiving position. Moreover, the control to change the position of the measurement area according to the display size is not required. Thus, it is possible to more simply perform uniformity correction.

Seventh Embodiment

Figure 17:
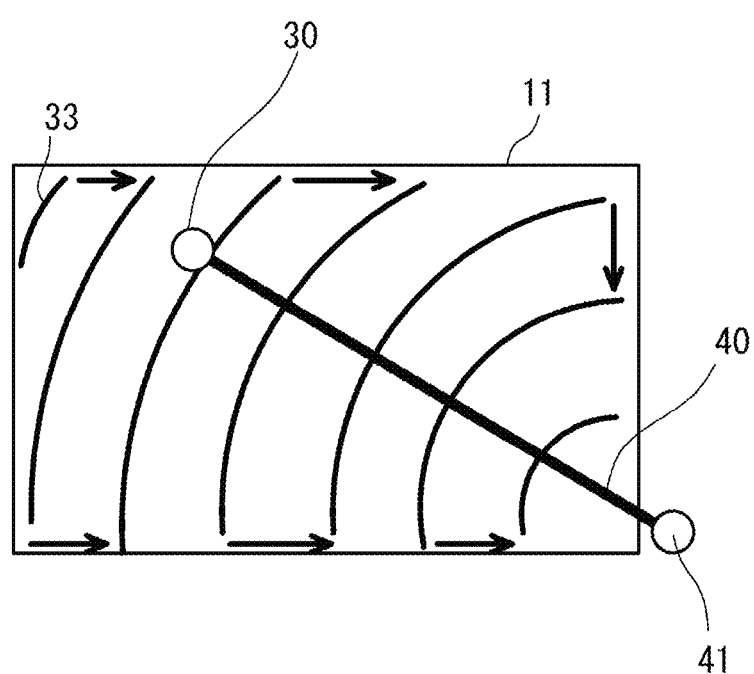
FIG. 17 is a diagram showing a movement locus of an optical sensor in an image display device according to a seventh embodiment.

An image display device according to a seventh embodiment and its control are described with reference to FIG. 17. In the present embodiment, the sequence for moving an optical sensor 30 is different from the fifth and sixth embodiments. FIG. 17 is a diagram showing a locus 33 on which the optical sensor 30 moves over a display 11. That is, an arm control unit 105 controls an arm 40 to continuously move the optical sensor 30 along the locus 33.

A sequence pattern of the rotation angle and the extension/retraction amount for each display size is preset in a correction control unit 101. Thus, the optical sensor 30 moves along the locus 33. In this manner, it is possible to shorten the moving time of the optical sensor 30 and to shorten the measurement time.

While moving along the locus 33, the optical sensor 30 detects display light. By a calculation process such as interpolation, it is possible to calculate the luminance at any position over the display screen. It is possible for a luminance measurement unit 103 to measure the luminance distribution. Then, a characteristic correction unit 106 performs uniformity correction according to the luminance distribution.

Naturally, the movement sequence is not limited to the locus 33 shown in FIG. 17. According to the size of the display 11, and the attachment position and the shape of the arm 40, any sequence pattern can be appropriately used as the locus 33.

The image display device 100 is suitable for medical monitors that display diagnostic images of patients. Since diagnostic images can be stably displayed with an appropriate display image quality, it is possible to contribute to the improvement of diagnosis accuracy. Diagnostic images include endoscopic images, magnetic resonance imaging (MRI) images, computed tomography (CT) images, X-ray images, and the like. By performing the above display control method, it is possible to easily satisfy the uniformity tolerance defined by the medical standards. Naturally, the image display device 100 is not limited to a medical monitor. For example, the image display device 100 is applicable to monitors for DTP and other uses.

The above embodiments can be appropriately combined. A part or all of the above processes may be performed by a computer program. The program can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, hard disk drives, etc.), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using any type of transitory computer-readable media. Examples of transitory computer readable media include electric signals, optical signals, and electromagnetic waves. Transitory computer-readable media can provide the program to a computer via a wired communication line (such as electric wires, and optical fibers) or a wireless communication line.

The invention made by the inventors has been described concretely based on the embodiments, but the present invention is not limited to the above embodiments, and various modifications can be made without departing from the scope. Two or more of the above embodiments can be appropriately combined.

The present disclosure is applicable to an image display device.

What is claimed is:

1. An image display device comprising:
   a tablet terminal having a display;
   a cradle capable of holding a plurality of types of tablet terminals;
   an optical sensor provided on the cradle and capable of receiving display light from the display;
   a processor coupled to a memory storing instructions to permit the processor to function as:
   a correction unit provided in the tablet terminal or the cradle;
   a profile storage unit provided in the tablet terminal or the cradle; and
   a correction control unit provided in the tablet terminal or the cradle; and
   a movable mechanism provided in the cradle, wherein:
   the cradle is provided with the optical sensor to be movable;
   the optical sensor moves over the display;
   the optical sensor is provided in such a manner that a light receiving position is changeable with respect to the display;
   the movable mechanism configured to change a light receiving position of the optical sensor with respect to the display;
   the profile storage unit is configured to store profile information for each of the plurality of types of tablet terminals, the profile information including a method for controlling a display characteristic;
   the correction control unit is configured to detect the type of the tablet terminal, and is configured to read the profile information for the detected type of the tablet terminal;
   the correction control unit is configured to control the movable mechanism according to the profile information for the detected type of the tablet terminal;
   the movable mechanism is configured to move the optical sensor to the light receiving position according to the profile information; and
   the correction unit is configured to correct a display image quality of the tablet terminal based on a result of the optical sensor detecting the display light at two or more light receiving positions by correcting the display characteristic when the display emits the display light in accordance with the profile information.

2. The image display device according to claim 1, wherein the movable mechanism is a rotating arm supporting the optical sensor, and
   wherein the optical sensor moves over the display by rotation of the rotating arm.

3. The image display device according to claim 1, wherein the processor further functions as:
   a luminance measurement unit provided in the tablet terminal or the cradle, and configured to measure detection luminance of the optical sensor in association with the light receiving position; and
   a characteristic correction unit provided in the tablet terminal or the cradle, and configured to correct a uniformity characteristic of the display based on a measurement result of the detection luminance.

4. The image display device according to claim 1, wherein the movable mechanism is an arm supporting the optical sensor, and
   wherein the arm is provided to be rotatable and extendable.

5. The image display device according to claim 3, wherein the cradle is capable of holding a plurality of sizes of the tablet terminal, and
   wherein, in the image display device, the processor functions as:
   a size identification unit provided in the tablet terminal or the cradle, and configured to identify a display size of the tablet terminal held by the cradle; and
   a movable mechanism control unit provided in the tablet terminal or the cradle, and configured to control the movable mechanism according to the display size.

6. The image display device according to claim 3, wherein the optical sensor is configured to detect the display light while the display displays a measurement pattern, and
   wherein the measurement pattern is at a uniform gradation level in a measurement area including the light receiving position.

7. A display control method of an image display device including:
   a tablet terminal having a display;
   a cradle capable of holding a plurality of types of tablet terminals, and configured to detect the type of the tablet terminal;
   an optical sensor provided on the cradle, wherein the optical sensor moves over the display so that a light receiving position of the optical sensor is changed with respect to the display; and
   a memory configured to store profile information for each of the plurality of types of tablet terminals, the profile information including a method for controlling a display characteristic,
   the display control method comprising:
   detecting the type of the tablet terminal placed on the cradle;
   reading the profile information for the detected type of the tablet terminal from the memory;
   controlling the light receiving position of the optical sensor with respect to the display based on the profile information;
   displaying the light from the display based on the profile information;
   detecting, by the optical sensor, the display light from the display; and
   correcting a display characteristic of the display based on a detection result obtained by the optical sensor by correcting the display characteristic.

8. The display control method according to claim 7, further comprising:
   changing the light receiving position of the optical sensor with respect to the display;
   measuring detection luminance of the optical sensor in association with the light receiving position; and
   correcting a uniformity characteristic of the display based on a measurement result of the detection luminance.

9. An image display device comprising:
   a tablet terminal having a display provided in a front side of the tablet terminal;

a cradle holding the tablet terminal, and including a front-side support part supporting the front side of the tablet terminal and a back-side support part supporting a back side of the tablet terminal;

an optical sensor configured to receive display light from the display; and a processor coupled to a memory storing instructions to permit the processor to function as a correction unit provided in the display terminal or the cradle, wherein:

the optical sensor is provided on the back-side support part;

the tablet terminal is placeable between the front side support part and the back-side support part so that a front side of the tablet terminal faces the back-side support part of the cradle;

the cradle is configured to detect the front side and the back side of a tablet terminal place on the cradle; and the correction unit is configured to correct a display quality of the tablet terminal based on a result of the optical sensor detecting the display light when the tablet terminal is placed on the cradle so that the display of the tablet terminal faces the back-side support part.

\* \* \* \* \*